United States Patent [19]
Lindblad

[11] 4,037,394
[45] July 26, 1977

[54] GRASS EJECTION SYSTEM FOR MOTOR-DRIVEN LAWN MOWERS

[75] Inventor: Sture Lindblad, Tranas, Sweden

[73] Assignee: Stiga AB, Tranas, Sweden

[21] Appl. No.: 590,166

[22] Filed: June 25, 1975

[30] Foreign Application Priority Data

June 26, 1974 Sweden .............................. 7408456

[51] Int. Cl.² ...................... A01D 35/22; A01D 53/06
[52] U.S. Cl. ........................................ 56/202; 56/13.4
[58] Field of Search ..................... 56/202, 13.4, 320.2, 56/17.5, 255

[56] References Cited

U.S. PATENT DOCUMENTS

| | | |
|---|---|---|
| 2,955,402 | 10/1960 | Strasel .................................. 56/13.4 |
| 2,983,096 | 5/1961 | Phelps ............................ 56/320.2 X |
| 3,178,872 | 4/1965 | Swindler ................... 56/13.4 |
| 3,191,370 | 6/1965 | Epstein ..................................... 56/202 |
| 3,708,968 | 1/1973 | Enters et al. ........................... 56/202 |
| 3,888,072 | 6/1975 | Templeton .......................... 56/320.2 |

*Primary Examiner*—Russell R. Kinsey
*Attorney, Agent, or Firm*—Beveridge, DeGrandi, Kline and Lunsford

[57] ABSTRACT

A system designed to improve the ejection effect in motor-driven lawn mowers having a casing formed with an ejection opening for the cut-off grass. The ejection opening is divided by a baffle into a part serving as a suction channel for sucking in air into the lawn mower casing, and a part serving as an ejection channel for the grass-laden air carrying the cut-off grass out of the casing.

6 Claims, 3 Drawing Figures

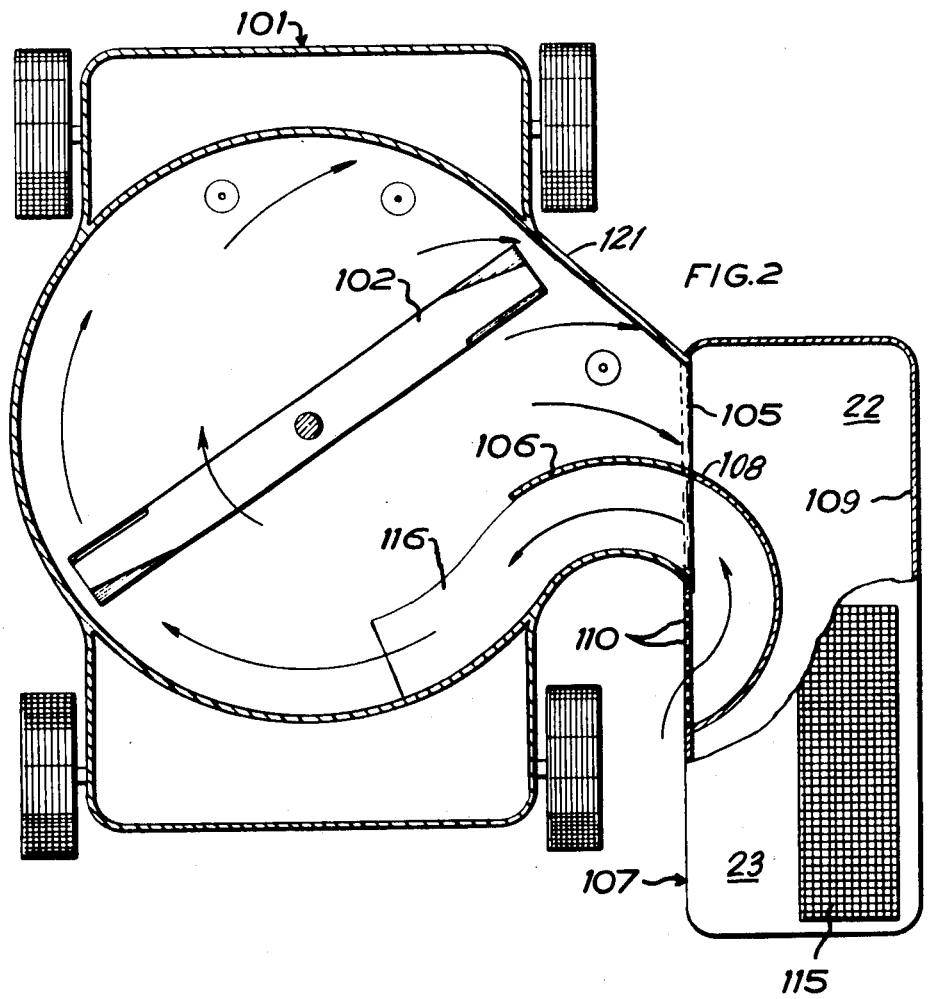
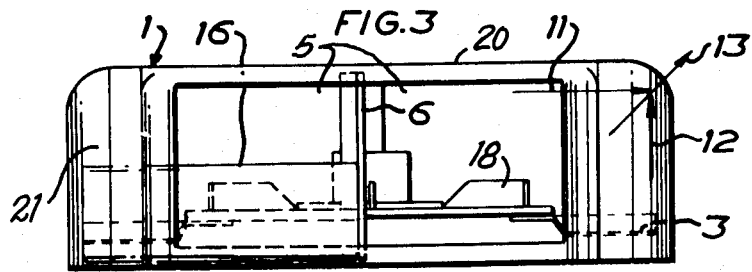

GRASS EJECTION SYSTEM FOR MOTOR-DRIVEN LAWN MOWERS

The invention relates to a grass ejection system for a motor-driven lawn mower, in which a stream of air carries the grass cuttings out of the casing of the mower.

The object of the invention is to provide an improved ejection in a motor-driven lawn mower having a casing which is formed with an ejection opening for the cut-off grass and in which a rotary cutting system in the form of a fan disk with cutting blades attached thereto or a rigid ground rotary knife blade in the form of a flat bar with angularly upwardly bent portions is provided. A grass supporting and conveying air stream is required in a lawn mower of this type for the ejection of the cut-off grass. To produce the air stream a satisfactory supply of air must be established to the interior of the casing. In prior art lawn mowers it has been tried to arrange for this supply of air through a gap surrounding the axis of the rotary cutting system between the mower engine and the casing, for instance in a rotary lawn mower with a vertical drive shaft. However, an arrangement of the kind described is entirely unsatisfactory in a lawn mower which is equipped with a grass cuttings collector in direct connection with the grass ejection opening.

To reduce the risk of solid objects being thrown out from under this type of lawn mowers during the mowing operation, the mower casing surrounding the cutting system and constituting the chassis of the lawn mower is drawn down so far towards the ground that the supply of external air to the mower is throttled to a considerable extent. This throttling effect will be at its maximum at low cutting heights, when the lower edge of the casing is very near the ground.

According to the invention, a baffle is disposed in the grass ejection opening of the mower casing surrounding one or more cutting means, said baffle extending inwardly toward the cutting means and dividing the ejection opening into a suction air channel which is defined by the baffle, the upper wall of the casing and one side of the ejection opening, and an ejection channel which is defined by the baffle, the upper portion of the casing and the other side of the ejection opening.

Embodiments of the grass ejection system according to the invention will be described in greater detail hereinbelow and with reference to the accompanying drawings in which:

FIG. 2 is a view similar to FIG. 1 of another type of lawn mower embodying the invention and including with a cutting means comprising a rigid rotary knife blade; and FIG. 3 is a view of the grass ejection opening of a lawn mower according to FIG. 1 as seen from the rear.

Figure 1:
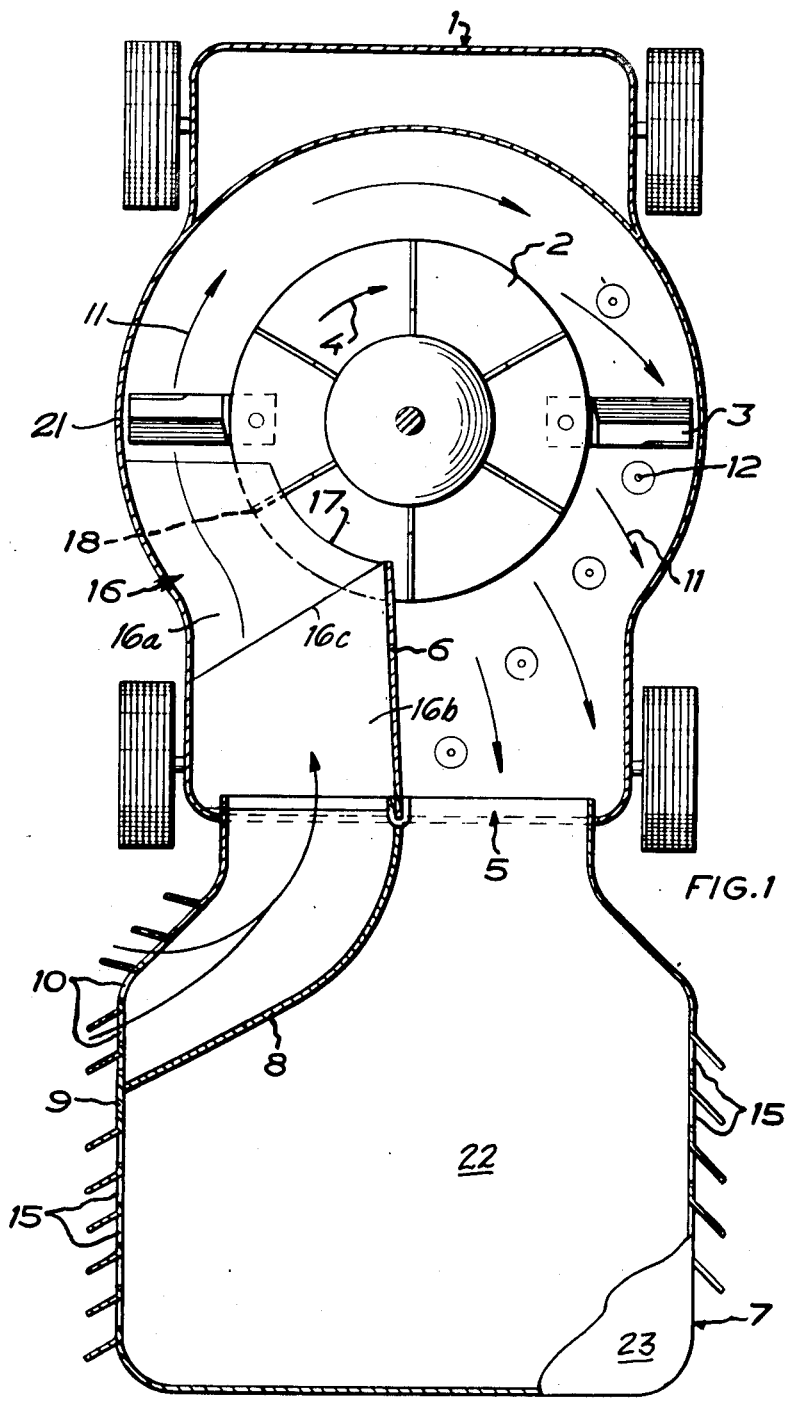
FIG. 1 is a sectional view taken on line 1—1 of FIG. 3 of a lawn mower casing embodying the invention and including a cutting system comprising a fan disk with pivotally mounted short knife blades attached thereto.

In FIGS. 1 and 2 the lawn mowers are shown in top plan views, with the upper cover portion of the mower casing removed for a better showing of the relevant parts.

In FIG. 1 the lawn mower casing is generally designated 1 and the rotary cutting system 2. The casing 1 includes a top wall 20 and downwardly dependent side walls 21 defined by a peripheral skirt. The rotary knife blades 3 rotate in the direction of rotation indicated by the arrow 4. The casing is formed with an opening 5 in the side wall 21 and a baffle in the form of a vertical partition 6 extends downwardly from top wall 20 and into the casing from the opening 5. In the embodiment illustrated in FIGS. 1 and 3, said partition, together with the top wall 20 and the side wall 21 at the right-hand side of opening 5 defines an outlet channel. The partition 6 can be oriented, for example by bending in different directions with respect to the axis of rotation of the cutting means, for instance the position indicated in FIG. 1, whereby the strength of the conveying air stream can be influenced. Partition 6 may suitably be disposed with its rear edge as shown in FIG. 1 and its surfaces angularly displaced to a vertical position counterclockwise from the position illustrated. By the action of the partition or baffle 6 and the rotating members of the mower within the casing, the incoming air stream through the left-hand portion of the opening 5 will be directed outwardly inside the casing to catch or pick up the grass cuttings along the periphery of the working area of the cutting means during its passage along the said periphery, and then to leave the interior of the casing through the right-hand portion of the opening 5. In the grass collector 7 connected onto the housing or casing 1 within or adjacent the grass ejection opening there is a baffle in the form of a partition 8 disposed between the bottom 22, roof 23 and side wall 9 of the grass collector. In the space formed by the housing of the grass collector and the partition 8 air intake holes 10 are provided, for instance on the side of the grass collector. The arrangement according to the invention generates a very strong air stream from the left-hand portion of the opening through which air is sucked into the lawn mower casing, said air stream flowing around the cutting means and escaping through the right-hand portion of the opening where the major proportion of the grass cuttings is ejected also under normal conditions. This will appear from FIG. 3 which shows that the air laden with the grass cuttings will be thrown radially outwardly by the action of the centrifugal force. Rotary cutting means are often provided with slanting portions or with vanes to produce an air stream which is substantially directed vertically upwardly to cause the produced air currents to lift the grass which is to be cut off by the cutting means. The resulting effect will be that the grass cuttings move in definite directions in the grass ejection opening and is concentrated to certain portions of said opening.

FIGS. 1 and 3 thus show by the arrows 11 how the conveying air owing to the centrifugal force will be directed outwardly towards the walls of the lawn mower casing. The same time as the air is thrown outwards it is also guided in an upward direction by the angularly bent knives 3 or knife points which have been arranged to provide an air stream which lifts the grass to facilitate cutting thereof. This outwardly directed air stream is marked in FIG. 1 by arrowheads encircled by a ring 12. It will be seen from FIGS. 1 and 3 how these two air streams act together and are composed to form one air stream in the direction of the arrow 13, i.e. in an upward right-hand direction. The grass cuttings conveyed by the air stream will thus be moved by the strength thereof outwardly into the upper right-hand corner of the opening. As a result, the left-hand and lower portions of the opening will not at all, or but to a very small extent, be exploited for the ejection of grass cuttings. The arrangement of the partition 6 thus affects the grass ejection operation to an extremely insignificant extent. By shielding off the left-hand portion of the outlet in the manner described it is possible to provide there an effective air intake for conveying air, without impairing the grass ejection effect.

The space of the grass collector receiving the grass cuttings is provided with a number of air vents 15 through which the conveying air escapes from the machine and the grass collector, while the grass cuttings remain in the grass collector.

The partition 6 illustrated in FIG. 1 extends from the roof of the casing 1 down to the lower part of said casing. It can extend inwardly over the path described by the cutting means of the fan disk and toward the axis of rotation. This will guide the conveying air more effectively in the desired direction. Such a guiding effect can be attained also by providing a vane 16 which extends below the top wall 20 between the baffle 6 and the left-hand boundary wall of the casing 1. Vane 16 has an inclined portion 16b which extends from the lower edge of the suction side of opening 5 to bend 16c, from which portion 16a extends in a generally horizontal direction over the plane of rotation of the fan disk. The inner boundary line 17 of said vane 16 will overlap the path described by the outermost portions of the fan blades 18.

In the embodiment of the invention illustrated in FIG. 2, the opening in the side wall of the casing is on the side of the mower rather than in the back as in the embodiment of FIGS. 1 and 3, just described. The basic structure and operation of the two embodiments are similar and the elements of FIG. 2 are designated by reference numerals in the 100 series ending in the same numerals used to designate corresponding elements in FIGS. 1 and 3. Thus, the embodiment of FIG. 2 includes a casing 101 having a top wall (not shown) and side walls 121 defined by a peripheral skirt depending downwardly from the top wall. An opening 105 in side wall 121 is divided into outlet and inlet portions by a vane 106 depending downwardly from the top wall of the casing and extending inwardly from the opening 105. A removable grass catcher 107 mounted on the casing 101 within or at the opening 105 has outer walls 109 with an air inlet 110 formed threrin. An inner wall or baffle 108 formed in the grass catcher 107 defines, in combination with the walls of the grass catcher and elements 121 and 106 of the mower, an air inlet channel. A screen or net 115 is provided over a vent opening in the catcher 107. A generally horizontal vane 116 may be provided in the inlet channel if desired.

The above embodiments of the invention were described for purposes of illustration rather than limitation. All possible variations and modifications of the invention are understood as being included within the scope of the appended claims.

What I claim and desire to secure by Letters Patent is:

1. A grass transport and ejection system for a motor driven lawn mower including a wheeled casing having a top wall and downwardly depending side walls defining an open-bottomed housing for a rotary cutting means equipped with means for generating an air stream for carrying grass cuttings out of the mower casing, and an opening in one side wall of the mower casing, the improvement comprising a baffle mounted within said housing adjacent said opening and extending inwardly therefrom and dividing the interior portion of the casing adjacent said opening into a suction air channel defined by one side of said baffle, said top wall, and a portion of the side wall of the casing adjacent one side of the opening; and an ejection channel defined by the other side of the baffle, said top wall of the casing and a portion of the side wall of said casing adjacent the other side of the opening.

2. In a motor driven lawn mower including a wheeled casing having a top wall and downwardly depending side walls defining an open-bottomed housing for a rotary cutting means equipped with means for generating an air stream for carrying grass cuttings out of the mower casing, an opening in one side wall of the mower casing, a grass collector having top, bottom and side walls forming a container, and an opening in one side wall of the container adapted to cooperate with the lawn mower casing side wall opening to form a communication between the interior of the lawn mower casing and the interior of the grass collector, a grass transport and ejection system comprising a first baffle in said lawn mower casing adjacent the opening in said one side wall and dividing the interior portion of the casing adjacent said opening into a suction air channel defined by one side of the baffle, said top wall and a portion of said one side wall adjacent one side of the opening, and an ejection channel defined by the other side of the baffle, said top wall and a portion of said one side wall adjacent the other side of the opening, and a second baffle cooperating with and forming an extension of the first baffle mounted in said grass collector adjacent said opening therein and extending inwardly towards the interior of the grass collector, said second baffle joining one side wall of the grass collector at a distance from the opening of the same and cooperating with the walls thereof to divide the interior portion of the grass collector adjacent its opening into a suction air channel, air intake openings in said grass collector walls permitting air to flow into said air suction channel and an air and grass inlet channel directed towards the remaining interior of the grass collector which serves as a grass collecting space, and vent means permitting escape of air from said grass collecting space.

3. A system as claimed in claim 1, wherein the portion of the opening of the casing forming the suction channel has an area smaller than that of the grass ejection channel.

4. A system as claimed in claim 1, wherein said baffle is of a curved shape and disposed within said housing to deflect the air stream flowing throughout slightly from the center of the cutting means in the direction of the desired air circulation in the closing.

5. A system as claimed in claim 1 having a vane which forms a bottom of the suction channel, said vane extending from the opening of the casing and the wall of said casing adjacent the opening inwardly towards and for at least some distance along the upper side of the peripheral portion of the operating range of the cutting means.

6. A system as claimed in any one of claim 2, wherein said first baffle is attached to the casing and said second baffle is fixed to the grass collector.

* * * * *